United States Patent Office 3,428,483
Patented Feb. 18, 1969

3,428,483
VINYLIDENE CHLORIDE COPOLYMER COATED POLYMERIC FILM CONTAINING STEATITE TALC IN THE COATING
Daniel Kenyon Owens, Bon Air, Va., assignor to E. I. du Pont de Nemours and Company, Wilmington, Del., a corporation of Delaware
No Drawing. Filed Jan. 13, 1965, Ser. No. 425,341
U.S. Cl. 117—145                                       3 Claims
Int. Cl. C08j 1/38; B32b 27/30, 23/08

ABSTRACT OF THE DISCLOSURE

The slip and blocking characteristics of vinylidene chloride copolymer coatings for regenerated cellulose and other organic polymeric films are improved without deleterious side effects by incorporating in the coatings between 0.25 and 1.2% by weight, based on the weight of copolymer, particulate steatite talc having a particle size within the range of 0.5 to 10 microns.

---

This invention relates to film coating and more particularly to improvements in polymeric film base materials coated with vinylidene chloride polymers.

It is common practice to incorporate into coatings for cellophane and other polymeric films a quantity of finely divided insoluble inorganic matter to confer good slip and anti-blocking properties to the coated film. At present two distinct types of inorganic material are generally used; one is a bentonite clay consisting mostly of montmorillonite and the other is finely ground muscovite mica. The bentonite clay has the advantages of a massive or three dimensional particle structure making it effective in low concentration and of having an optimum range of particle size. It has the disadvantages of a refractive index differing greatly from that of vinylidene chloride coating polymers, and of the particles being internally opaque. Both of these properties result in the coated cellophane having increased haze when bentonite clay is used. Bentonite clay, moreover, is strongly hydrophilic and this property results in a diminution of the moisture barrier properties of coatings containing it.

Muscovite mica has the advantages of being a relatively transparent particle and of having a refractive index close to that of the vinylidene chloride copolymer coatings. Mica, therefore, contributes little haze to the coated film. Mica, however, has the disadvantage of having essentially a two dimensional or plate-like structure and is therefore not as effective as a slip agent and must be used in higher concentrations. It is moreover, hard and abrasive and may result in damage to the coated film and to manufacturing and customer machinery by abrasive wear. Mica is much less hydrophilic than bentonite clay and coatings containing mica exhibit better moisture barrier properties when abrasive damage is absent.

It is therefore a principal object of this invention to provide a vinylidene chloride copolymer-coated polymeric film having good slip and blocking properties in the coating thereof having no adverse effect on film appearance and moisture resistance, and being free of undesired abrasive effects. It is a further object to provide a process for coating regenerating cellulose film with vinylidene chloride copolymer coatings to provide a coated regenerated cellulose film having the attributes outlined above. The foregoing and related objects will more clearly appear from the description to follow.

These objects are accomplished by the present invention which, briefly stated, comprises coating a polymeric film, e.g., regenerated cellulose film, with a coating composition comprising essentially a copolymer of vinylidene chloirde and at least one ethylenically unsaturated monomer copolymerizable therewith, and between 0.25% and 1.2% by weight, based on the weight of said copolymer in said composition, of particles of steatite talc uniformly distributed in said composition, the size of said particles being substantially in the range of 0.5 micron to 10 microns, shape of said particles being substantially three dimensional wherein any one dimension of said particle is of a value at least 75% of the mean value of the other two dimensions, and drying said coated sheet.

The grade of talc, known as steatite, a hydrous magnesium silicate, is massive in character rather than the usual platy form, and is commercially available in forms which have the unusual property in that they wet preferentially with organic materials in the presence of water, a property which greatly facilitates dispersability of the solid particles in vinylidene chloride copolymer coating compostions. Additionally steatite has a refractive index which approximates the refractive index of the polymer coating; has low moisture absorption; and has a low specific gravity which minimizes undesirable settling in the coating composition. For purposes of this invention the steatite talc should be of a particle size ranging between about 0.5 micron to about 10 microns, the shape of said particles being substantially three dimensional wherein any one dimension of a particle is of a value at least 75% of the mean value of the other dimensions. Preferably the particle size is within the range of about 2 to about 7 microns. If there is an appreciable amount of particles of a size larger than about 10 microns, the surface of the coated film may tend to take on a grainy or rough appearance and texture. The solid particles of steatite talc should comprise between 0.25% and 1.2% by weight based on the weight of the vinylidene chloride copolymer; the preferred range being from 0.3% to 0.6%.

As representative examples from the class of copolymers of vinylidene chloride and at least one ethylenically unsaturated monomer copolymerizable therewith, useful for coating regenerated cellulose and other polymer films as described herein, there may be mentioned copolymers of vinylidene chloride/acrylonitrile,
vinylidene chloride/methylacrylate ,
vinylidene chloride/methacrylonitrile,
vinylidene chloride/ethylacrylate,
vinylidene chloride/propylacrylate,
vinylidene chloride/butylacrylate,
vinylidene chloride/isobutylacrylate,
vinylidene chloride/methylmethacrylate,
vinylidene chloride/ethylmethacrylate,
vinylidene chloride/butylmethacrylate,
vinylidene chloride/isobutylmethacrylate,
vinylidene chloride/methylvinyl ketone,
vinylidene chloride/vinyl chloride,
vinylidene chloride/vinyl acetate,
vinylidene chloride/styrene,
vinylidene chloride/dichlorovinylidene fluoride,
vinylidene chloride/chloroprene,
vinylidene chloride/butadiene, and
vinylidene chloride/methoxymethoxyethyl methacrylate.

An unsaturated organic acid such as itaconic acid or acrylic acid may be copolymerized with each of the above to give three component systems. Also useful are copolymers of vinylidene chloride/dimethyl itaconate, vinylidene/diethyl itaconate, vinylidene, chloride/dibutyl itaconate, vinylidene chloride/vinyl pyridine and vinylidene chloride/isoprene. In the preferred embodiment of this invention the vinylidene chloride copolymer contains at least 75% of vinylidene chloride, the other components of the copolymer comprising alkyl acrylates and methacrylates where the alkyl group contains 1 to 3 carbon atoms such as methyl acrylate, ethyl acrylate, propyl acrylate or methyl methacrylate, acrylonitrile and itaconic acid.

Any polymeric film susceptible to being coated with a vinylidene chloride copolymer may be used for purposes of this invention. Because of its commercial importance, regenerated cellulose film constitutes a preferred base film. Other suitable base materials are films of polyvinyl alcohol, slowly esterified or esterified cellulose as well as various cellulose esters such as cellulose acetate, cellulose nitrate, cellulose acetate-butyrate, polyvinyl acetals, etc. Also, thermoplastic films such as those of polyethylene, polypropylene, as well as higher olefins and olefin copolymers, polyvinyl chloride, polyvinyl fluoride and polyesters such as polyethylene terephthalate, may be coated with the coating of this invention. For some films solvent applied coatings are preferred. For others the slip particulate may be incorporated in an aqeuous polymeric coating dispersion.

The following examples will serve to more fully illustrate the principles and practice of my invention. Parts are by weight unless otherwise indicated.

EXAMPLE 1

A typical coating composition was made up as follows. Into 182 parts of toluene at 25° C. was placed a copolymer of 92 parts of vinylidene chloride, 2 parts of methyl methacrylate, 6.0 parts acrylonitrile and 0.5 part of itaconic acid and the mixture was slurried for 30 minutes. To this slurry was added 275 parts of tetrahydrofuran and the mixture was stirred at 40° C. until solution was complete which required about 20 minutes. In a separate container were placed 43 parts of toluene, 2 parts of refined candelilla wax, 2 parts of stearamide, 2 parts of calcium stearate and 0.4 part of a particulate material hereinafter specified, and the mixture was stirred for 30 minutes at 100° C. until the wax, rosin derivative and calcium stearate were dissolved and the particulate agent was thoroughly slurried. The latter mixture was added to the polymer solution and the mixture was stirred for 1 hour at 40° C. Thereafter a regenerated cellulose base sheet was coated with this lacquer and then dried. The dried coated films contained, in each case, 0.3% by weight of particulate agent, based on the weight of copolymer. Coating weight was approximately four grams per square meter.

To illustrate the effect of several different particulate materials on the haze and slip characteristics of the coated film the following comparisons were made

TABLE I

| Particulate Material | Haze, percent | Coefficient of Friction | |
|---|---|---|---|
| | | Starting | Kinetic |
| Steatite talc | 1.34 | .39 | .32 |
| Talcum U.S.P.[1] | 1.11 | .45 | .40 |
| Bentonite clay (Volclay BC) | 2.26 | .34 | .29 |

[1] Particles classified to give average particle size of 5 microns; approximately 90% in size range of 1–10 microns. Average particle size of steatite talc was 3.5 microns; 97% in size range of 0.5–10 microns. Average particle size of bentonite clay was 4.2 microns; 97% in size range of 1–10 microns. Haze value was measured by ASTM method D-1003-59T. Coefficient of friction measurements were made as described by D. K. Owens, Journal of Applied Polymer Science 8 1465 (1964). For machine application of films, it is desired that kinetic coefficient of friction be below 0.35 to insure efficient operation.

EXAMPLE 2

To illustrate the difference in haze value and coefficient of friction of coated film containing bentonite clay, mica and steatite talc, respectively, regenerated cellulose films were coated as in Example 1 employing the same coating composition with the indicated particulate materials. The particulate materials were incorporated at 0.4% by weight levels in each case. The following results were obtained.

TABLE II

| Particulate Material | Haze, percent | Coefficient of Friction (Kinetic) |
|---|---|---|
| Steatite talc | 2.27 | 0.20 |
| Mica | 1.78 | 0.33 |
| Bentonite clay | 3.35 | 0.19 |

Films having a haze value greater than 3.0 are not suitable for many packaging uses.

EXAMPLE 3

To illustrate the differences in moisture barrier characteristics of coatings containing the several different particulate materials, vinylidene chloride copolymer-coated regenerated cellulose films containing, respectively, steatite talc, mica and bentonite clay were prepared as described in Example 1. Moisture barrier properties were measured over a period of several months and the average values obtained are shown in tabular form below.

TABLE III

| Particulate material: | Average moisture vapor transmission[1] |
|---|---|
| Steatite talc | 70 |
| Mica | 75 |
| Bentonite clay | 100 |

[1] Values for moisture vapor transmissions are expressed in grams/100 square meters/hour for a 24 hour period.

EXAMPLE 4

Further differences in the characteristics of various particulate materials, are shown in the following table:

TABLE IV

| Particulate Material | Hardness (Moh Scale) | Refractive Index | Shape | Density |
|---|---|---|---|---|
| Steatite talc | 1 | 1.59 | Massive-plate-like | 2.6 |
| Talcum U.S.P. | 1 | 1.59 | Plate-like | 2.6 |
| Muscovite Mica | 3.4 | 1.59 | do | 2.7–3.0 |
| Bentonite Clay | 1 | 1.51–1.53 | Massive | 2 |

To further illustrate the difference in hydrophilic character between particulate materials, the following example was carried out.

EXAMPLE 5

Approximately equal weights of steatite talc and bentonite clay were dried overnight in an oven at 105° C. They were weighed, then exposed to an atmosphere of 66% relative humidity, then weighed again after 5 hours and 22 hours exposure and the weight gain at each time calculated. The results are shown in tabular form as follows:

TABLE V

| Particulate Material | Weight Gain, Percent | |
|---|---|---|
| | 5 hours | 22 hours |
| Steatite Talc | .18 | .22 |
| Bentonite Clay | 4.25 | 8.55 |

Results substantially the same as described above were obtained when regenerated cellulose was coated with coating compositions corresponding to vinylidene chloride/acrylonitrile (weight ratio 90.5/9/5); vinylidene chloride/acrylonitrile/itaconic acid copolymer (weight ratio 90.5/9/0.5) and vinylidene chloride/methyl acrylate/itaconic acid copolymer (weight ratio 90/9.5/0.5). In each case a superior combination of desired properties, namely, good film appearance, moisture-proofness and good slip characteristics were obtained for the use of this steatite talc as compared with the other particulate materials described.

I claim:
1. A polymeric film coated on at least one surface with a continuous coating consisting essentially of (1) a copolymer of vinylidene chloride and at least one ethylenically unsaturated monomer copolymerizable therewith, said copolymer containing at least 75% by weight of vinylidene chloride, and (2), between 0.25% and 1.2% by weight, based on the weight of said copolymer, of particles of steatite talc, the size of said particles being substantially in the range of 0.5 micron to 10 microns, the shape of said particles being substantially three dimensional wherein any one dimension of said particle is of a value at least 75% of the mean value of the other two dimensions, said particles being incorporated in said coating.

2. The product of claim 1 wherein said polymeric film is regenerated cellulose film.

3. The product of claim 2 wherein said copolymer consists of 92 parts by weight of vinylidene chloride, 2 parts of methyl methacrylate, 6 parts of acrylonitrile, and 0.5 part of itaconic acid.

References Cited

UNITED STATES PATENTS

| | | | |
|---|---|---|---|
| 2,096,296 | 10/1937 | Fromm | 18—50 |
| 2,528,506 | 11/1950 | Foye | 18—59 |
| 2,634,459 | 4/1953 | Irons | 18—57 |
| 2,729,194 | 1/1956 | Jones | 118—308 |
| 2,748,027 | 5/1956 | Meier | 117—145 X |
| 2,758,564 | 8/1956 | Randall | 118—309 |
| 2,909,449 | 10/1959 | Banigan | 117—145 |
| 3,108,017 | 10/1963 | Messward et al. | 117—145 X |
| 3,144,377 | 8/1964 | Eastes | 117—145 X |
| 3,232,791 | 2/1966 | Whitehouse | 117—145 |
| 3,248,374 | 4/1966 | Covington | 117—145 X |

FOREIGN PATENTS

| | | |
|---|---|---|
| 150,216 | 2/1953 | Australia. |
| 522,345 | 3/1956 | Canada. |
| 805,072 | 11/1958 | Great Britain. |
| 961,988 | 6/1964 | Great Britain. |

OTHER REFERENCES

Hackh's Chemical Dictionary, Second Edition, 1937, p. 913, QD5H3 1937 C13.

WILLIAM D. MARTIN, *Primary Examiner.*

M. LUSIGMAN, *Assistant Examiner.*

U.S. Cl. X.R.

117—138.8, 161